G. DINKEL.
AUTOMATIC FUEL FEED MECHANISM FOR FURNACES.
APPLICATION FILED FEB. 11, 1910.
970,191.
Patented Sept. 13, 1910.
3 SHEETS—SHEET 1.
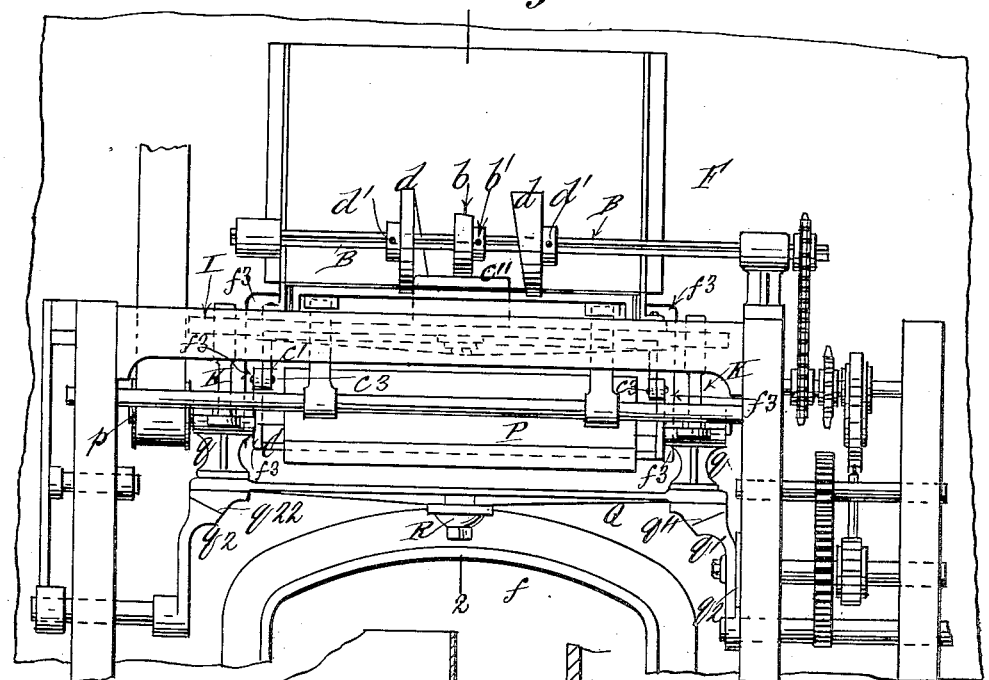
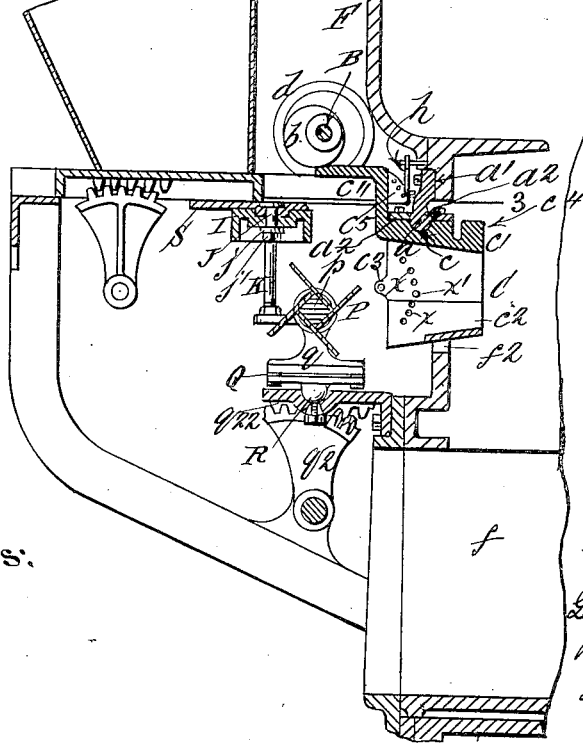
Witnesses:
Inventor:

G. DINKEL.
AUTOMATIC FUEL FEED MECHANISM FOR FURNACES.
APPLICATION FILED FEB. 11, 1910.

970,191.

Patented Sept. 13, 1910.

3 SHEETS—SHEET 2.

Witnesses:
D. W. Gardner.

Inventor:
George Dinkel
By his Attorney
Geo. W. Miatt

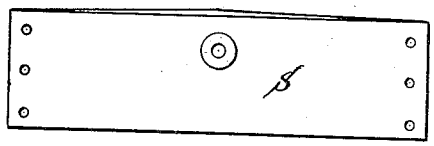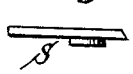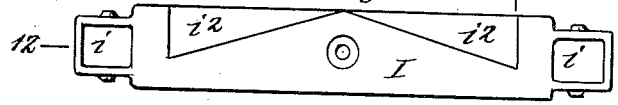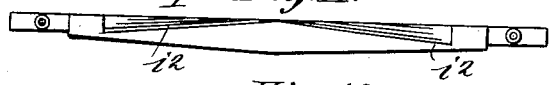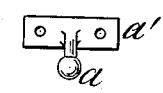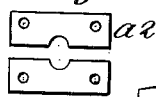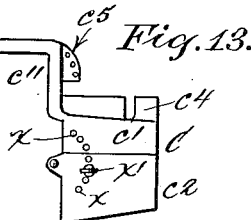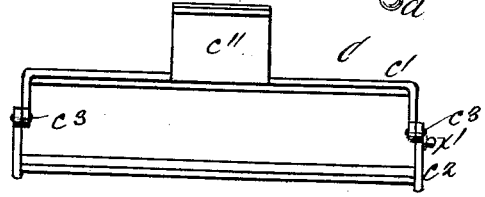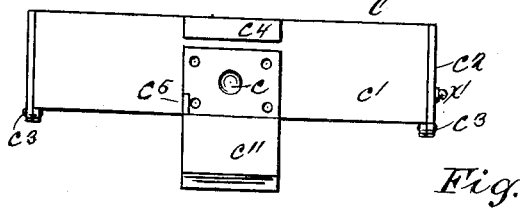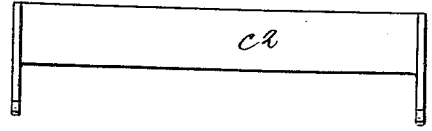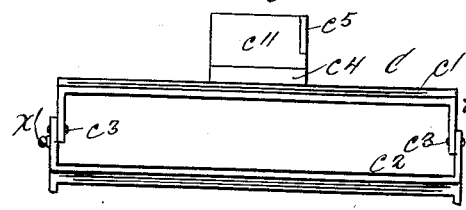

UNITED STATES PATENT OFFICE.

GEORGE DINKEL, OF JERSEY CITY, NEW JERSEY.

AUTOMATIC FUEL-FEED MECHANISM FOR FURNACES.

970,191.

Specification of Letters Patent. Patented Sept. 13, 1910.

Application filed February 11, 1910. Serial No. 543,304.

*To all whom it may concern:*

Be it known that I, GEORGE DINKEL, a citizen of the United States, residing in Jersey City, Hudson county, and State of New Jersey, have invented certain new and useful Improvements in Automatic Fuel-Feed Mechanism for Furnaces, of which the following is a specification.

My invention relates to automatic feeding of coal to a furnace of any kind, more particularly to the feeding of culm, small anthracite and bituminous to steam boiler furnaces as set forth in my concurrent application Serial No. 461,616 filed November 9, 1908, the distinguishing feature in which case is that the motion imparted to the fuel propeller is essentially an oscillating motion in two planes, the planes being at right angles to each other. In other words the propeller oscillates in a vertical plane and at the same time oscillates in a horizontal plane about a common center.

My present invention relates to specific means for feeding the coal to the propeller, and also to a special form of chute through which the fuel is projected by the propeller and by which the screen of fuel may be deflected substantially as hereinafter described and claimed.

Figure 3:
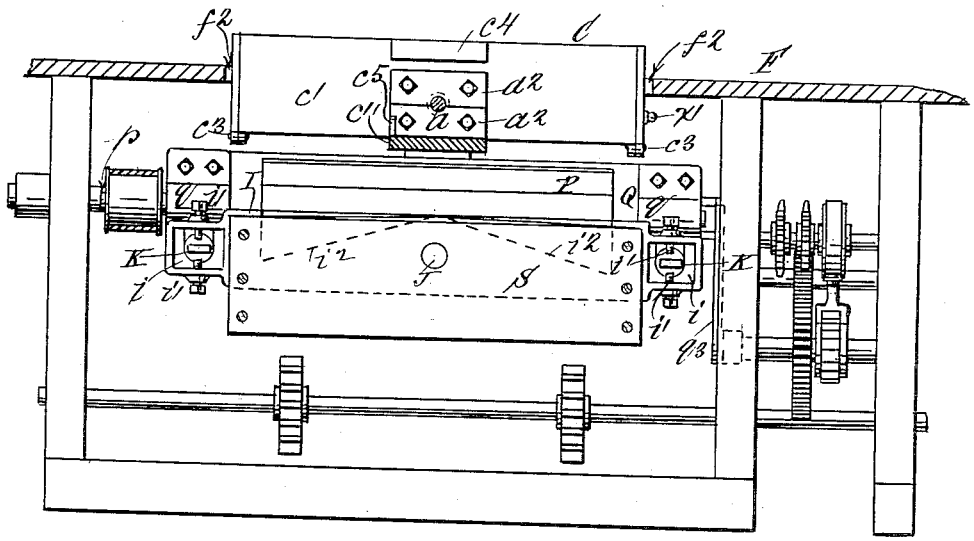
Figure 4:
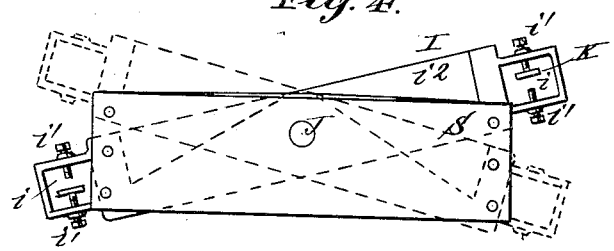
Figure 5:
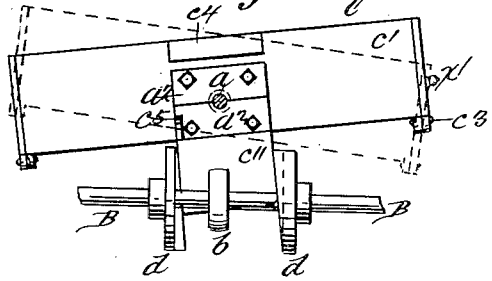

In the accompanying drawings, Figure 1, is a front elevation of my improved fuel feed mechanism; Fig. 2, is a sectional elevation upon plane of line 2—2— Fig. 1; Fig. 3, is a horizontal section upon plane of line 3—3— Fig. 2, the fuel forwarder being omitted; Fig. 4, is a diagrammatic view showing the top of the fuel shelf and illustrating in dotted lines the movement of the distributer plate thereon and with relation thereto; Fig. 5, is a diagram illustrating the horizontal deflection of the fuel feed; Fig. 6, is a view of the underside of the fuel shelf; Fig. 7, an end view of the shelf; Fig. 8, is a longitudinal section of the fuel shelf; Fig. 9, is a top view of the distributer plate; Fig. 10, is a transverse section upon plane of line 10—10— Fig. 9; Fig. 11, is a view of the rear side view of the distributer plate; Fig. 12, is a longitudinal section upon plane of line 12—12— Fig. 9; Fig. 13, is a side elevation of the chute in detail; Figs. 14 and 15, detail views of the ball and socket joint for the support of the chute; Fig. 16, is a front elevation of the chute; Fig. 17, is a top view thereof; Fig. 18, is a top view of the lower section of the chute; Fig. 19, is a rear elevation of the chute.

F, represents a boiler furnace of ordinary construction provided with the usual furnace door opening $f$. In addition to the furnace door opening $f$, the front of the furnace is formed with a feed opening $f^2$, in which is suspended a chute C, through which the fuel is projected into the furnace. The chute C is suspended by means of a ball and socket joint, consisting of a spherical knuckle $a$, projecting downward from the bracket $a'$, secured to the front of the furnace,—said knuckle $a$, being seated in a socket $c$, formed for its reception in the upper section $c'$, of the chute C, the knuckle being confined therein by bearing plates $a^2$, $a^2$, secured to said upper section $c'$.

The chute C, consists of the two sections $c'$, $c^2$, pivotally connected, as at $c^3$, and the upper and lower inner surfaces of these sections are preferably convergent inward as shown in Fig. 2. A series of holes $x$, are formed in the two sections $c'$, $c^2$, of the chute C, concentric with the pivot $c^3$, and a coupling pin $x'$, passing through these holes in coincidence is used to hold the two sections $c'$, $c^2$, in prescribed positions with relation to each other vertically. Obvious other means of adjustment may be resorted to with like results, and I do not restrict myself in this respect. The object of this adjustment is to provide means whereby the inner mouth or opening of the chute may be varied in width vertically for the purpose of controlling the flow of fuel through the chute.

The upper section $c'$, of the chute is formed with an upwardly projecting central arm $c''$, the forward end of which protrudes into the path of a depressing cam $b$, on the cam shaft B, when said cam is in position for action. The portion of the chute C, to the rear of the knuckle $a$, is of greater weight than the front portion, so that the arm $c''$, is held against the depressing cam $b$, by gravity, and this action may be insured if necessary by forming a counterweight $c^4$, on the upper section $c'$, of the chute C.

The depressing cam $b$, when in position rocks the chute C, vertically. It is rocked laterally when desired by one or more side cams $d$, on the shaft B, the inclined portions of which act against the sides of the arm $c''$ These cams $d$, $d$, are adjustable upon the shaft B, so that the lateral throw or thrust of the arm $c''$, and chute C, may be regulated and varied if desired. All three cams $b$, $d$, $d$, are mounted upon the shaft B, by means which admit of their being removed out of contact with the arm $c''$, when necessary, as when it is desired to hold the chute C, in a prescribed fixed position. In the drawings these cams are shown as applied to the shaft B, and provided with set screws $d'$, $d'$, and $b'$, by which they are secured in any desired position longitudinally on the shaft B,—the spline preserving the position and timing of the cams with relation to each other.

When the cams are dispensed with as above intimated the chute C, may be held in a prescribed position by means of a hook $h$, engaging with anyone of a series of holes in the segment $c^5$, on the upper section $c'$, of the chute C, or by any other suitable and well known expedient.

I oscillate the propeller P longitudinally by the central fulcrum in such manner that its ends are alternately advanced and retracted with relation to the furnace opening, as well as raised and lowered, the motion imparted to the propeller being essentially an oscillating motion in two planes, the planes being at right angles to each other. That is to say the propeller oscillates in a vertical plane and at the same time oscillates in a horizontal plane above a common center. This I accomplish by mounting a shaft $p$, upon bearings $q$, $q$, supported on the platform Q, which is mounted on a central fulcrum R, preferably consisting of a ball and socket or so called universal joint, and by supporting the end of the platform Q, upon segmental gears $q'$, $q^2$. These segmental gears $q'$, $q^2$, are opposed to each other in eccentricity, but otherwise are duplicates in so far as their thrust and travel is concerned. They engage with racks $q''$, $q^{22}$, on the underside of the platform Q, and are actuated by a rod $q^3$, pivotally connected with the segmental cam gear $q'$, the motion being transmitted by the platform Q, to the opposed segmental cam gear $q^2$, as in my concurrent application hereinbefore referred to. My present invention in this connection consists in the introduction of a distributing plate I, interposed between the propeller P, and the fuel shelf S, to which latter the distributing plate is pivoted centrally so as to be free to turn in a horizontal plane and to conform to the horizontal thrust of the propeller, from which it derives its motion as hereinafter set forth.

The distributing plate I, is suspended upon the under side of the fuel shelf S, by means of a pivot bolt J, the head of which is countersunk in the said shelf, the lower end of which is provided with a nut and washer $j$, $j'$, upon which the distributing plate rests. The bolt J is arranged centrally with relation to the length of the shelf S; and each end of the distributer plate I, is formed with an eye or opening $i$, in the side walls of which are arranged screw bearings $i'$, between which rests the upper end of an upright K, secured to an extension or bracket on the corresponding end of the propeller carriage Q, below. Thus as the carriage Q and propeller P, oscillate both vertically and horizontally the distributing plate I, will follow the horizontal thrust, so as to keep the edge of the said distributing plate parallel with the longitudinal axis of the propeller. By this means the fuel is fed to the propeller blades during their forward thrust beyond the edge of the shelf S, in a parallel line to the axis of the propeller, and at the same relative distance from the blades, so that the advanced end of the propeller acts uniformly upon the fuel fed to it.

In order to facilitate the discharge of the fuel from the distributer plate I, its inner edge is beveled as at $i^2$, converging gradually from near either extremity to the center of the plate as will be seen by reference to Fig. 11.

What I claim as my invention and desire to secure by Letters Patent is,

1. The combination of a furnace front provided with a feed opening, a chute provided with a ball and socket joint, said chute suspended in said feed opening by means of the ball and socket joint, means for oscillating said chute on said ball and socket joint, a rotatable propeller arranged to precipitate fuel through said chute, means for imparting to said propeller an oscillatory motion in two planes at right angles to each other, and means for feeding fuel to said rotatable propeller, substantially in the manner and for the purpose set forth.

2. The combination of a furnace front provided with a feed opening, a chute provided with a ball and socket joint, said chute suspended in said feed opening by means of said ball and socket joint, means for oscillating said chute vertically, a rotatable propeller arranged to precipitate fuel through said chute, means for imparting to said propeller an oscillatory motion in two planes at right angles to each other, and means for feeding fuel to said rotatable propeller, substantially in the manner and for the purpose described.

3. The combination of a furnace front provided with a feed opening, a chute provided with a ball and socket joint, said chute suspended in said feed opening by means of the ball and socket joint, means for oscillating said chute horizontally, a rotatable propeller arranged to precipitate fuel through said chute, means for imparting to said propeller an oscillatory motion in two planes at right angles to each other, and means for feeding fuel to said rotatable propeller, substantially in the manner and for the purpose set forth.

4. The combination of a furnace front provided with a feed opening, a chute provided with a ball and socket joint, said chute suspended in said feed opening by means of said ball and socket joint, means for oscillating said chute both vertically and horizontally, a rotatable propeller arranged to precipitate fuel through said chute, means for imparting to said propeller an oscillatory motion in two planes at right angles to each other, and means for feeding fuel to said rotatable propeller, substantially in the manner and for the purpose set forth.

5. The combination of a furnace front provided with a feed opening, a chute provided with a ball and socket joint, said chute suspended in said feed opening by means of the ball and socket joint, means for oscillating said chute on said ball and socket joint, means for securing said chute in a prescribed position, a rotatable propeller arranged to precipitate fuel through said chute, means for imparting to said propeller an oscillatory motion in two planes at right angles to each other, and means for feeding fuel to said rotatable propeller, substantially in the manner and for the purpose set forth.

6. The combination of a furnace front provided with a feed opening, a chute provided with a ball and socket joint, said chute suspended in said feed opening by means of the ball and socket joint and consisting of two pivotally attached sections, means for adjusting said sections upon and with relation to each other, means for oscillating said chute on said ball and socket joint, a rotatable propeller arranged to precipitate fuel through said chute, means for imparting to said propeller an oscillatory motion in two planes at right angles to each other, and means for feeding fuel to said propeller, substantially in the manner and for the purpose set forth.

7. The combination of a furnace front provided with a feed opening, a chute provided with a ball and socket joint, said chute suspended in said feed opening out of the center of gravity by means of the ball and socket joint, a counterbalance on said chute, means for oscillating said chute on said ball and socket joint, a rotatable propeller arranged to precipitate fuel through said chute, means for imparting to said propeller an oscillatory motion in two planes at right angles to each other, and means for feeding fuel to said rotatable propeller, substantially in the manner and for the purpose described.

8. In combination with a furnace having a fuel opening, a fuel propeller arranged to project fuel through said opening, consisting of a rotatable shaft provided with beaters for impact with the fuel, means for rotating said shaft, means for imparting to said propeller an oscillatory motion in two planes at right angles to each other, fuel feed mechanism arranged above said propeller, a distributing plate interposed between said fuel feed mechanism and said propeller, said distributing plate being supported pivotally and arranged to travel in a horizontal plane and means for maintaining the alinement of said distributing plate and the longitudinal axis of the propeller, for the purpose described.

GEORGE DINKEL.

Witnesses:
D. W. GARDNER,
GEO. WM. MIATT.